United States Patent [19]

Zaydel

[11] Patent Number: 4,529,244
[45] Date of Patent: Jul. 16, 1985

[54] PLASTIC VEHICLE BODY PANEL MOUNTING STRUCTURE

[75] Inventor: Wieslaw S. Zaydel, Rochester, Mich.

[73] Assignee: General Motors Corporation, Detroit, Mich.

[21] Appl. No.: 442,861

[22] Filed: Nov. 19, 1982

[51] Int. Cl.³ .................. B62D 27/04; B62D 29/04
[52] U.S. Cl. .................. 296/191; 296/31 P;
296/146; 403/405; 24/289; 24/297; 411/84;
411/92; 411/366
[58] Field of Search .................. 296/31 R, 31 P, 187,
296/191, 202, 146; 293/120, 121, 155; 403/407,
405; 24/289–291, 297; 411/84, 85, 90, 92, 93,
96, 119, 366, 395

[56] References Cited

U.S. PATENT DOCUMENTS

| | | | |
|---|---|---|---|
| 3,456,706 | 7/1969 | Ollis, Jr. | 411/84 |
| 3,875,661 | 4/1975 | Lidstrom et al. | 296/31 P |
| 4,043,239 | 1/1976 | De Fusco | 411/947 |
| 4,153,290 | 5/1979 | Barenyi et al. | 296/191 |
| 4,352,521 | 10/1982 | Trenkler | 296/191 |
| 4,385,779 | 5/1983 | Kimura et al. | 293/155 |

Primary Examiner—Randolph Reese
Assistant Examiner—Dennis H. Pedder
Attorney, Agent, or Firm—Charles E. Leahy

[57] ABSTRACT

A vehicle body panel structure includes a plastic panel mounted upon an underlying metal substructure. A fastener fixedly attaches one end portion of the plastic panel on the metal structure. A mounting block is slidably mounted on the metal substructure longitudinally spaced from the fastener to define a path of longitudinal movement of the mounting block toward and away from the fixed end portion of the plastic panel. A spring urges the mounting block to a certain longitudinal position and is yieldable to permit movement of the mounting block away from the certain longitudinal position. A fastener attaches the plastic panel to the mounting block so that the plastic panel is effectively supported in a manner enabling longitudinal movement relative to the fixed one end portion to accommodate thermal or hygroscopic growth of the plastic panel.

2 Claims, 12 Drawing Figures

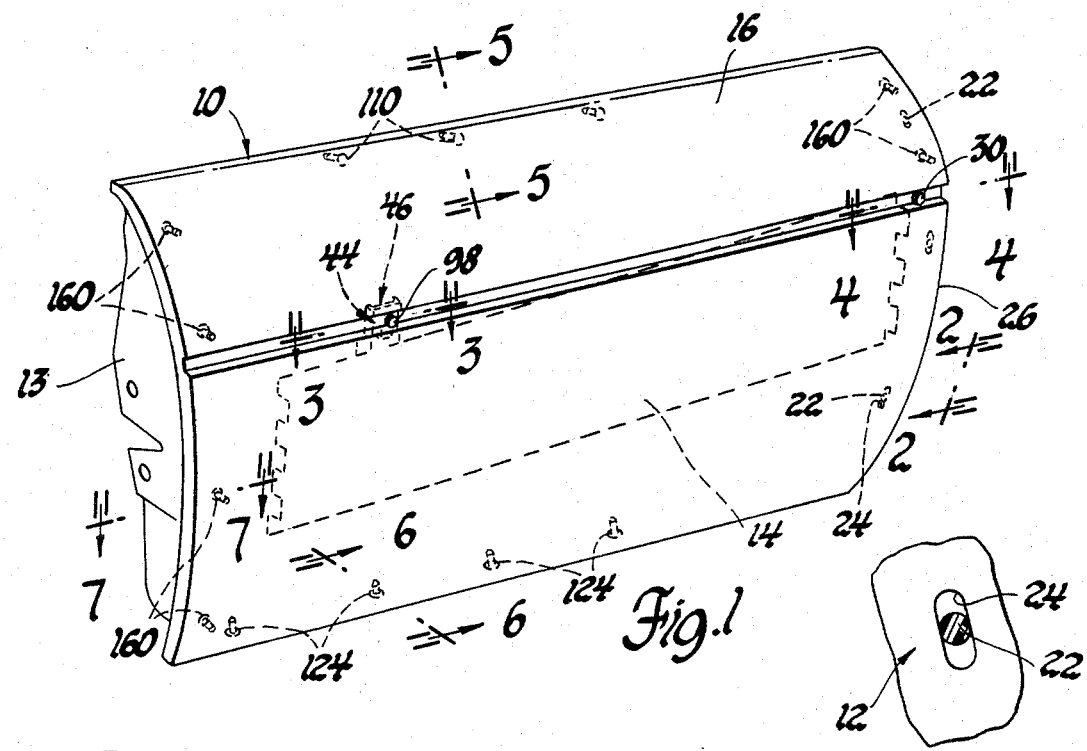
Fig.1
Fig.2
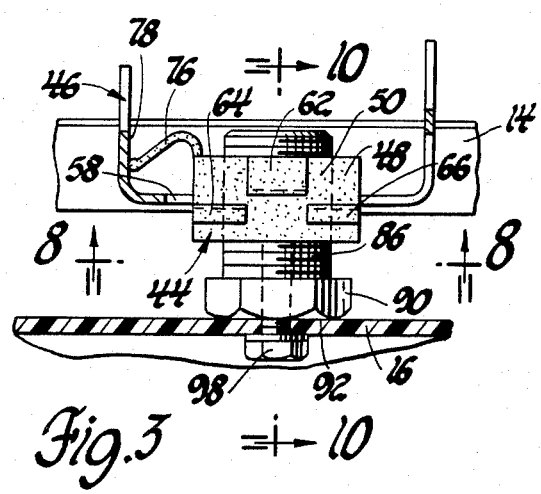
Fig.3
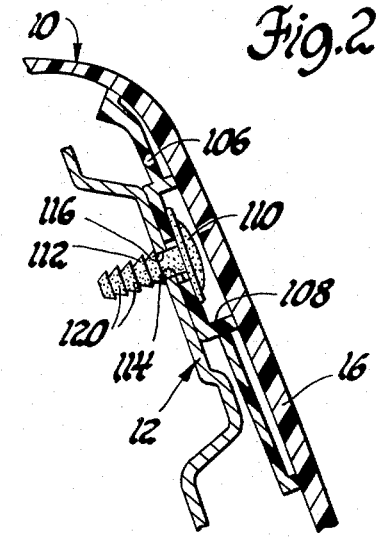
Fig.5
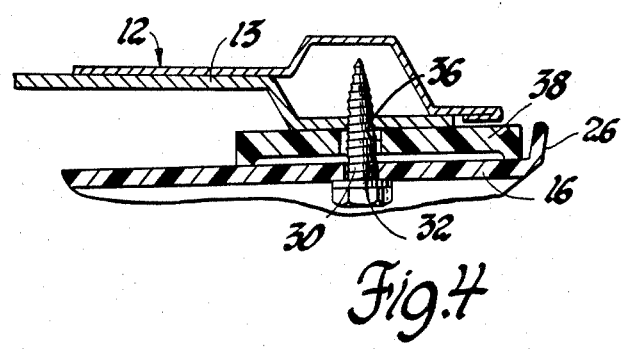
Fig.4

PLASTIC VEHICLE BODY PANEL MOUNTING STRUCTURE

The invention relates to a vehicle body panel structure including a plastic body panel mounted on the metal substructure of a vehicle body in a manner to obtain precise alignment and spacing relative to adjacent body panels and to permit movement of the plastic panel to accommodate thermal and hydroscopic growth of the plastic panel.

BACKGROUND OF THE INVENTION

It is well known in motor vehicles to provide a vehicle body panel structure such as a door including a metal substructure and to mount a decorative plastic outer body panel on the metal substructure to define the outer appearance surface of the vehicle body. The use of such plastic panels is desirable in order to obtain vehicle design goals such as weight reduction and corrosion resistance. Furthermore, relatively soft and flexible plastic body outer panels offer a lessened susceptibility to damage from minor impact.

A shortcoming of the use of plastic body outer panels to define the outer appearance surface of a motor vehicle body is that the plastic panel cannot be welded to the adjacent panels or to the underlying metal substructure. Furthermore, the attachment of the plastic panel to the metal substructure can result in highly visible surface distortion of the plastic panel unless the plastic panel is mounted on the substructure in a precise manner in which the relatively flexible plastic panel is not twisted or bent.

The challenge of mounting a plastic panel upon the metal substructure is further complicated by the fact that the plastic panel and the metal substructure have substantially different rates of thermal expansion. Furthermore, plastic panels are known to have a high rate of hydroscopic growth causing the plastic material to grow substantially in dimension under conditions of high humidity.

When the plastic panel is mounted on the metal substructure by conventional screw or rivet type fasteners, the thermal and hydroscopic growth of the plastic panel causes the panel to exhibit highly visible surface distortion characteristics such as bulges and ripples.

It would be desirable to provide an attachment of a plastic outer body panel upon the body substructure by a device and in a manner which enables thermal and hydroscopic growth of the plastic panel while permitting the body outer panel to preserve a distortionfree appearance.

Furthermore, it would be desirable to provide a plastic panel mounting device and method by which the plastic panel is mounted on the metal substructure in a manner which precisely aligns and spaces the plastic panel with the adjacent plastic panels irrespective of manufacturing tolerance and dimensional variation in the metal substructure.

SUMMARY OF THE INVENTION

The invention provides an apparatus and method for mounting a vehicle body plastic panel upon an underlying metal substructure. The longitudinal location of one end of the plastic panel is fixed by machining a locating feature in the metal substructure at a precise location relative the adjacent body panel and then positioning the plastic panel on the metal substructure with an integrally molded locating element of the plastic panel engaging with the machined locating feature. A screw is then installed between the plastic panel and the substructure. A mounting member is slidably mounted upon a support bracket of the substructure and includes first molded plastic block having an integrally molded spring finger engaging the bracket to resiliently urge the mounting block to a certain longitudinal position on the metal substructure and a second mounting block which is connected thereto by a screw thread by which rotation of the second mounting block establishes a mounting face thereon at a precise position transversely of the vehicle body for abutment by and support of the plastic panel in precise transverse surface alignment with the adjacent body panel. The mounting face of the second mounting member also provides a field for the drilling of a fastener hole for receiving a fastener attaching the plastic panel to the mounting member. Accordingly, thermal or hydroscopic growth of the plastic panel induces longitudinal movement of the mounting member so that the plastic panel is movably supported for distortionfree growth relative the underlying metal substructure.

BRIEF DESCRIPTION OF THE DRAWINGS

These and other objects, features and advantages of the invention will become apparent upon consideration of the specification and the appended drawings in which:

FIG. 1 is a perspective view of a vehicle door including a metal substructure having a plastic panel mounted thereon according to the invention;

FIG. 2 is an enlarged fragmentary view showing the engagement between a machined mounting slot on the metal substructure and an integral locating stud on the plastic panel to establish the longitudinal position of the forward edge of the plastic panel;

FIG. 3 is a sectional view taken in the direction of arrows 3—3 of FIG. 1 and showing the mounting block assembly for movably mounting the rearward portion of the plastic panel;

FIG. 4 is a sectional view taken in the direction of arrows 4—4 of FIG. 1 and showing a screw attaching the forward end of the plastic panel to the metal substructure;

FIG. 5 is a sectional view taken in the direction of arrows 5—5 of FIG. 1 showing a typical attachment between the top edge of the plastic panel and the metal substructure;

DESCRIPTION OF THE PREFERRED EMBODIMENT

Figure 6:
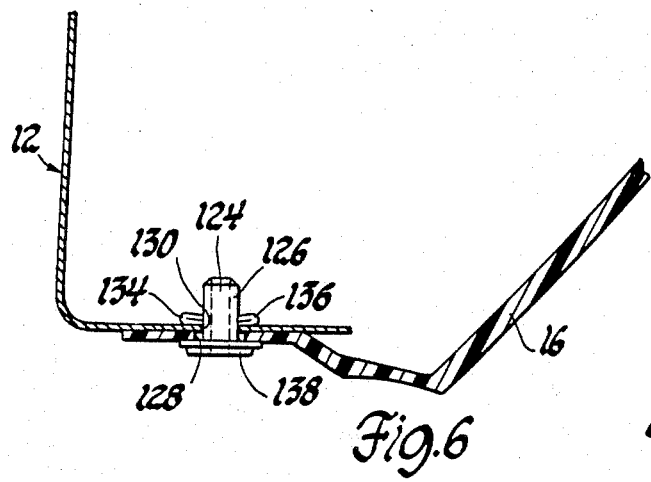
FIG. 6 is a sectional view taken in the direction of arrows 6—6 of FIG. 1 and showing a typical attachment between the bottom edge of the plastic panel and the metal substructure.

Referring to FIG. 1, there is shown a vehicle body door 10 including a metal substructure, generally indicated at 12. The metal substructure is defined by a plurality of welded together metal panels including an inner panel 13 and a guard beam 14. A molded outer plastic panel 16 is provided for mounting on the substructure 12 to define the outer appearance surface of the door 10. The plastic panel 16 may be a urethane which is made by a reinforced reaction injection molding process. The urethane body panel has a thermal expansion rate which differs from that of the metal substructure 12 and is also highly hydroscopic with the result that the plastic panel 16 expands and contracts much more than the metal substructure 12.

As seen in FIGS. 1 and 2, the plastic panel 16 has an integrally molded and precisely positioned locating stud 22 which is adapted to extend into a vertical slot 24 provided in the metal substructure 12. The slot 24 is pierced or otherwise machined into the substructure 12 after the substructure 12 is mounted on the vehicle body by the door hinges so that the slot 24 can be located at a precise longitudinal distance relative the adjacent body panel, in this case the trailing edge of the front fender. Accordingly, when the plastic panel 16 is placed upon the door substructure 12 with the locating stud 22 extending through the slot 24, the leading edge 26 of the plastic panel 16 will be precisely spaced from the trailing edge of the adjacent fender. The plastic panel 16 may be adjusted vertically as permitted by vertical movement of the locating stud 22 within the vertical extent of the slot 24.

Referring to FIGS. 1 and 4, it will be seen that the vertical position of the forward end of plastic panel 16 is maintained by a screw 30 which extends through a hole 32 in the plastic panel 16 and an aligned oversized hole 36 provided in a plastic reinforcement 38 which is adhesively bonded or otherwise made integral with the plastic panel 16. The screw 30 extends into the inner panel 13 of the metal substructure 12. Prior to drilling through inner panel 13 for the screw 30, the plastic panel 16 is adjusted vertically to align the appearance features of the plastic panel 16 with the appearance features of the adjacent panel such as the front fender.

Figure 10:
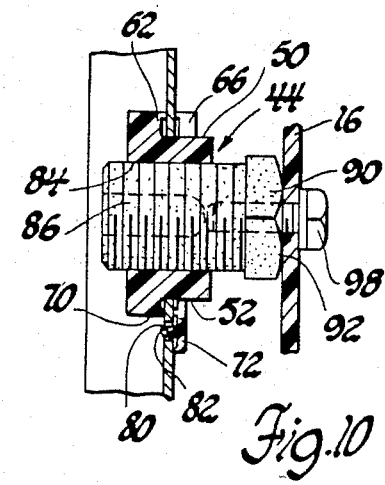
FIG. 10 is a sectional view taken in the direction of arrows 10—10 of FIG. 3.
Figure 11:
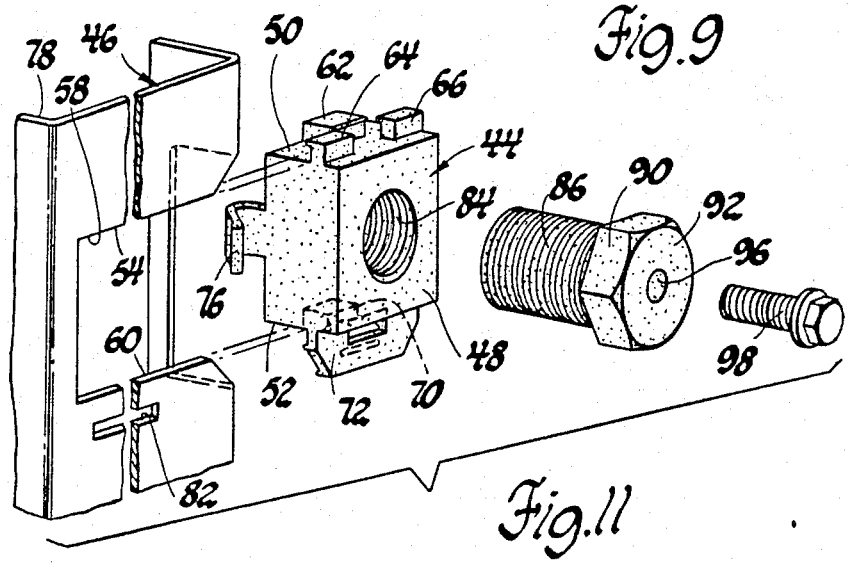
FIG. 11 is an exploded perspective view of the mounting block assembly.

The rear portion of the plastic panel 16 is mounted on the metal substructure 12 by an adjustable mounting block assembly, generally indicated at 44, which is mounted upon a support bracket 46 carried by the door guard beam 14. As seen in FIGS. 3, 8, 9, 10 and 11, the mounting block assembly 44 includes a first molded plastic mounting block 48 having a top surface 50 and bottom surface 52 which slidably fit between upper and lower walls 54 and 60 of of a slot 58 provided in the support bracket 46. The top surface 50 of the block 48 has abutments 62, 64 and 66 which slidably engage the support bracket 46 to retain the block 48 and define a path of longitudinal fore and aft sliding movement of the block 48. Abutments 70 and 72 are integrally molded and project from the bottom surface 52 of the mounting block 48. As best seen in FIGS. 3 and 11, the mounting block 48 also has an integrally molded spring finger 76 which is adapted to engage against a wall 78 of the support bracket 46 as shown in FIG. 3 to resiliently urge mounting block 48 forwardly within the slot 58. A ramp 80, best shown in FIG. 9, projects from the abutment 72 and extends within a longitudinal slot 82 of support bracket 46. The ramp 80 has a shoulder 83 which engages with the wall of slot 82 to limit the forward movement of block 48 by the spring finger 76 and thereby preposition the block 48 at a certain longitudinal position.

The mounting block 48 also has a central threaded bore 84 adapted to receive the threaded shank 86 of a second molded plastic mounting block 90. The second mounting block 90 has a mounting face 92 which is engageable by the door plastic panel 16 as shown in FIGS. 3 and 10 and which also provides a field for the drilling of a hole 96 for an attaching bolt 98.

Prior to assembly of the plastic panel 16 onto the metal substructure 12, the mounting block assembly 44 is slidably engaged within the slot 58 of the support bracket 46. The second mounting block 90 is rotated so that the interaction between the threaded shank 86 and the central threaded bore 84 of the second mounting block 48 causes the second mounting block 90 to adjust transversely of the vehicle body. Accordingly, the use of an appropriate measuring gauge, not shown, enables the second mounting block 90 to be adjusted transversely so that its mounting face 92 is prepositioned at a precise transverse location which will subsequently establish the exact lateral alignment of the rear portion of the plastic panel 16 so that the plastic panel aligns precisely with the surface of the adjacent body panel rearwardly of the plastic door panel 16. Furthermore, the drilling of the hole 96 for the attaching bolt 98 is drilled at assembly and while the rear portion of the plastic panel is held at a vertical position aligning with the appearance features of the adjacent panel rearwardly of the plastic panel 16. Accordingly, when the bolt 98 is driven through the plastic panel 16 and into the second block 90, the door panel 16 is precisely aligned with the rearwardly adjacent panel in both the transverse and vertical directions.

Referring to FIG. 5, there is shown one of the several fasteners for attaching the top edge of the plastic panel 16 to the door substructure 12. The plastic reinforcement 106 which is adhesively bonded or otherwise integrally secured to the plastic panel 16 has an integrally molded cage 108 which captures the head 110 of a molded plastic push-in fastener 112. The fastener 112 extends through an oversized circular aperture 114 of the reinforcement 106 so that the fastener 112 floats in the vertical and horizontal directions relative the plastic panel 16. The underlying panel of the door substructure 12 has an aperture 116 through which the fastener 112 is inserted. Fastener 112 is of injection molded plastic and has a plurality of serially arranged conical barbs 120 which snap engage with the substructure 12 to effectively retain the top edge of the plastic panel 16 on the substructure 12, and yet permit vertical and longitudinal movement of the plastic panel 16 relative to the substructure 12.

Referring to FIG. 6, there is shown a typical attachment of the bottom edge of the plastic panel 16 to the underside of the door substructure 12. The fastener is preferably a collapsible rivet 124 having a tubular shank 126 which is thrust through an oversized aperture 128 of the plastic panel 16 and through a hole 130 of the substructure 12. An installation tool, not shown, reaches through the bore of the collapsible rivet 124 and is actuated to collapse the shank 126 axially so that the tab portions 134 and 136 of the shank 126 are folded outwardly to capture the substructure 12 and plastic panel 16 between the tabs 134 and 136 and the head 138 of the collapsing rivet. The aperture 128 is oversized with respect to the collapsible rivet 124 so that the plastic panel 16 is permitted to move transversely and longitudinally of the substructure 12.

Figure 7:
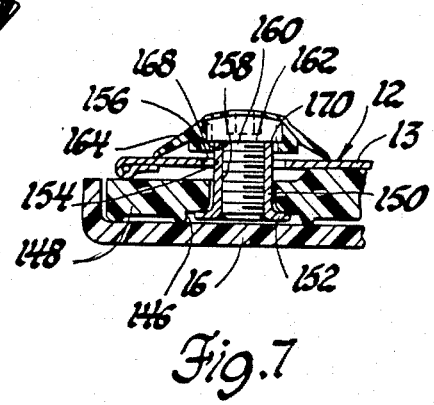
FIG. 7 is a sectional view taken in the direction of arrows 7—7 of FIG. 1 and showing a typical attachment between the front and rear edges of the plastic panel and the metal substructure.
Figure 8:
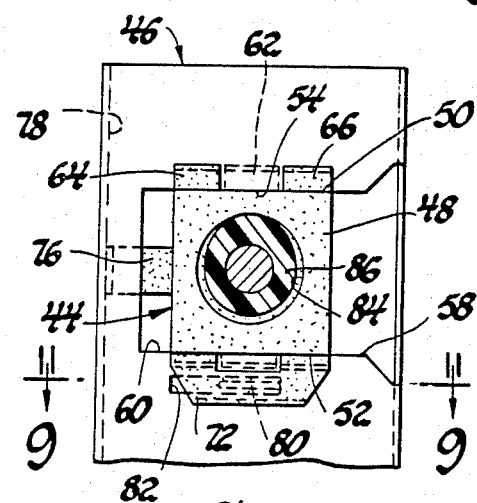
FIG. 8 is a sectional view taken in the direction of arrows 8—8 of FIG. 3.
Figure 9:
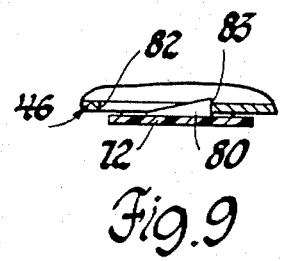
FIG. 9 is a sectional view taken in the direction of arrows 9—9 of FIG. 8.

Referring to FIG. 7, there is shown a fastener which is typical of the several fasteners connecting the leading and trailing edges of the plastic panel 16 to the substructure 12. A recess 146 is provided within the reinforcement 148 adhesively bonded or otherwise integrally secured with the plastic panel 16. A T-shaped nut 150 has a flange 152 which seats within the recess 146 and a shank 154 which extends through an oversized aperture 156 in the inner panel 13 of door substructure 12. The shank 154 has a threaded bore 158 which receives a screw assembly 160 which is installed from inside the door. The screw assembly 160 includes a metal screw 162 and a molded plastic flexible skirt 164. The screw 162 has a base 168 which engages with the end face 170 of the shank 154. Skirt 164 extends into contact with the inner panel 13 of substructure 12 and yieldably biases the screw 162, the nut 150, and the plastic panel 16 inwardly of the vehicle so that the reinforcement 148 of the plastic panel 16 bears upon the inner panel 13 of the substructure 12. The oversized aperture 156 in the inner panel 13 of the substructure 12 permits the plastic panel 16 and the nut 150 to move both vertically and longitudinally relative to the door substructure 12.

Thus, it is seen that new and improved method and apparatus is provided for precisely mounting the plastic panel upon a metal substructure. More particularly the thermal and hydroscopic growth of the plastic panel 16 is accommodated by longitudinal sliding movement of the mounting block assembly 44 upon the metal substructure toward and away from the leading edge 26 of the plastic panel 16. Longitudinal movement of the top, bottom and rear edges of the plastic panel is also accommodated by the respectively disclosed attachments.

Figure 12:
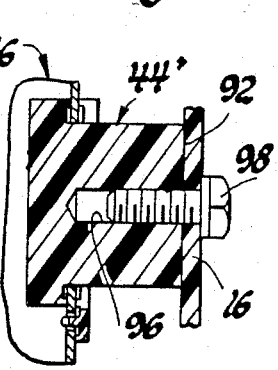
FIG. 12 is a view similar to FIG. 10 but showing a second embodiment of the invention.

Referring to FIG. 12, there is shown an alternative embodiment of the mounting block assembly 44'. In this embodiment, the second mounting block and first mounting block are integrally molded. The lateral adjustment of the mounting face 92 is provided by milling or otherwise machining the mounting block assembly 44' to define a mounting face 92 which is precisely located transversely of the vehicle body so that the plastic panel 16 will be precisely located for proper surface alignment with the adjacent body panel. The hole 96 and attaching bolt 98 are provided in the same manner as disclosed in the preferred embodiment of FIG. 10.

The embodiments of the invention in which an exclusive property or privilege is claimed are defined as follows:

1. A vehicle body panel structure comprising a metal substructure, a plastic panel for covering the metal substructure, fastening means fixedly attaching one end portion of the panel to the metal substructure, and a mounting means mounting a longitudinally spaced second portion of the panel to the metal substructure, said mounting means having a longitudinally slidable first mounting member and a transversely adjustable second mounting member, slide means mounting the first mounting member on the metal substructure to define a path of longitudinal sliding movement of the first mounting member relative to the fastening means, spring means urging the first mounting member to a certain longitudinal position and being yieldable to permit movement of the first mounting member away from the certain longitudinal position, means acting between the first and second mounting members to mount the second mounting member for transverse adjusting movement to establish the second mounting member at a precise position transversely of the vehicle body, and means attaching the second portion of the panel to the second mounting member whereby the second portion of the panel is precisely mounted transversely of the vehicle body and the second portion of the panel is movable longitudinally relative the one end portion attached to the substructure upon thermal or hydroscopic growth of the plastic panel.

2. A vehicle body panel structure comprising a metal substructure, a plastic panel for covering the metal substructure, fastening means fixedly attaching one end portion of the plastic panel to the metal substructure, a mounting block, slide means mounting the mounting block on the metal substructure in longitudinal spaced relation from the fastening means to define a path of longitudinal movement of the mounting block toward and away from said fixed one end portion of the plastic panel, spring means urging the mounting block to a certain longitudinal position and being yieldable to permit movement of the mounting block away from the certain longitudinal position, and means attaching the plastic panel to the mounting block whereby the plastic panel is effectively supported in a manner enabling longitudinal movement of the plastic panel relative the fixed one end portion attached to the substructure upon thermal or hydroscopic growth of the plastic panel.

* * * * *